(12) United States Patent
Wu

(10) Patent No.: US 7,991,886 B1
(45) Date of Patent: Aug. 2, 2011

(54) METHOD AND APPARATUS FOR INDIVIDUAL-CENTRIC USE OF THE INTERNET

(75) Inventor: Guangdian Gordon Wu, Houston, TX (US)

(73) Assignee: Base Base Corporation, Houston, TX (US)

( * ) Notice: Subject to any disclaimer, the term of this patent is extended or adjusted under 35 U.S.C. 154(b) by 886 days.

(21) Appl. No.: 09/822,097

(22) Filed: Mar. 30, 2001

(51) Int. Cl.
*G06F 15/173* (2006.01)

(52) U.S. Cl. ........ 709/225; 709/203; 709/217; 709/223; 709/224

(58) Field of Classification Search .................. 709/200, 709/202, 203, 218, 205, 217, 223, 246, 224, 709/225; 705/26; 707/6, 9, 100, 203
See application file for complete search history.

(56) References Cited

U.S. PATENT DOCUMENTS

| | | | | |
|---|---|---|---|---|
| 6,055,513 A * | 4/2000 | Katz et al. | | 705/26 |
| 6,076,166 A * | 6/2000 | Moshfeghi et al. | | 707/9 |
| 6,199,077 B1 * | 3/2001 | Inala et al. | | 709/202 |
| 6,401,085 B1 * | 6/2002 | Gershman et al. | | 709/223 |
| 6,412,073 B1 * | 6/2002 | Rangan | | 713/202 |
| 6,424,979 B1 * | 7/2002 | Livingston et al. | | 707/203 |
| 6,510,451 B2 * | 1/2003 | Wu et al. | | 709/203 |
| 6,567,784 B2 * | 5/2003 | Bukow | | 705/9 |
| 6,691,106 B1 * | 2/2004 | Sathyanarayan | | 707/3 |
| 6,802,042 B2 * | 10/2004 | Rangan et al. | | 715/200 |
| 6,907,465 B1 * | 6/2005 | Tsai | | 709/232 |
| 7,069,242 B1 * | 6/2006 | Sheth et al. | | 705/37 |
| 7,200,804 B1 * | 4/2007 | Khavari et al. | | 715/230 |
| 7,269,664 B2 * | 9/2007 | Hutsch et al. | | 709/246 |
| 7,627,503 B1 * | 12/2009 | Champagne et al. | | 705/27 |
| 7,672,879 B1 * | 3/2010 | Kumar et al. | | 705/30 |
| 7,792,962 B2 * | 9/2010 | Mager et al. | | 709/225 |
| 2001/0011264 A1 * | 8/2001 | Kawasaki | | 707/1 |
| 2002/0116386 A1 * | 8/2002 | Fabri et al. | | 707/100 |
| 2002/0116394 A1 * | 8/2002 | Van Doorn | | 707/104.1 |

* cited by examiner

*Primary Examiner* — Ramy M Osman
(74) *Attorney, Agent, or Firm* — Baker Botts, L.L.P.

(57) ABSTRACT

An individual-centric Internet is provided with a personal base process on a computer system. The computer system is equipped with multiple nodes that are interconnected to facilitate the communication between the nodes. The personal base service includes a personal base instance that is typically in software on at least one of the nodes of the computer system, such as a network. The personal base instance is designed to communicate with a user by any digital or analog device, such as a telephone, personal computer, personal digital assistant, or the like. A personal base server is instantiated on at least one of the nodes on the computer system and is in operative communication with the personal base instance. The personal base server is used to communicate with other personal bases or other nodes on the computer system or network in order to insulate the user from other elements of the computer system.

39 Claims, 8 Drawing Sheets

Personal Base

Top Info
Breaking News, Weather, Stocks, Traffic, Emergency

Communication
My Family, Work Related, Family and Friends, Group 1, Group 2, Online Chat, ICQ, Instant Messenger, Video Conferencing

Information
News, Business News, Company News, Sports Scores, Local News

Transactions
Shopping, Stock Trade, Bill Paying, Bank Accounts, Investment, Travel Arrangement

Internet Activities
Community, Vote, Being Monitored

Notice Board
Events, Products, Services, Activities

Request and Feedback
My Constant Searches, Job-Seeking, My Specific Searches, Yahoo Search

Supply and Feedback
Sell Things, Provide Service, my Resume

Life Management
Calendar, To Do List, Dates and Events, Current Task 1

Monitoring and Control
Kid 1, Kid 2, House, Pet, Car 1, Car 2, Car PC, Cell Phone, TV, VCR

Work
Project 1, Project 2, Files, Contacts

Study
School, Hobby, Knowledge

Entertainment
Games, Movies, Music, Radio, TV, Leisure Reading, Chess

Information Archive
From Cell Phone, Links, Topic 1, Topic 2

File Storage
My Files, Photos, Web Sites, Newspapers, Music

Editing
My Base, Passwords, Dates, Addresses, Grocery List, Clothes Size, Social Security Number, Secure Files

Figure 6

METHOD AND APPARATUS FOR INDIVIDUAL-CENTRIC USE OF THE INTERNET

CROSS REFERENCE TO RELATED APPLICATION

This application is related to pending U.S. patent application Ser. No. 09/821,052, entitled "Method and Apparatus for Individual-Centric Use of the Internet" that was filed on Mar. 29, 2001.

BACKGROUND OF THE INVENTION

1. Field of the Invention

The present invention relates to network agents. More specifically, the present invention relates to network agents and network databases that are combined to provide a permanent virtual presence on a network such as the Internet.

2. Description of the Related Art

The explosive growth of the Internet has popularized the sending and receiving of electronic mail (e-mail) and the World Wide Web. The Web and e-mail have enabled individuals and vendors to buy and to sell products or services directly. E-mail is well-tailored to the individual user; all of the e-mails sent or received by a user are available to that user. Web-browsing, however, is not tailored to the individual, who must visit different Web sites to fulfill different needs. For instance, a user might go to a specific Web site, sign in to prove his identity, and input personal data in order to enable various transactions. Furthermore, the information on the Web site that is useful to that user typically comprises a small portion of the total content of that Web site. Time and energy are required for the user to search for the needed information. Finally, there is no convenient place for the user to store, compile, access and use information he has successfully acquired. In sum, the current architecture of the Internet's World Wide Web implements a "Web site-centric" paradigm rather than an "individual-centric" paradigm that is exemplified by e-mail.

The Internet comprises a vast number of computers and computer networks that are interconnected through communication links. The interconnected computers exchange information using various services, such as electronic mail and the World Wide Web ("WWW" or simply "Web"). A Web computer server system (i.e., Web server) can send collections of textual and graphical content, called Web pages, to a remote client computer system. The remote client computer system can then display the Web pages. Each Web page corresponds to a Uniform Resource Locator ("URL"). A user at a client system can request a server system to send a Web page by entering the Web page URL into a Web browser. A Web browser is a software application that manages communication between the client system and other computers connected to the Internet. Example Web browsers include Netscape Navigator, manufactured by Netscape Corporation of Mountain View, Calif.; Opera, manufactured by Opera Software A/S of Oslo, Norway; and Internet Explorer, manufactured by Microsoft Corporation of Redmond, Wash.

Web pages are typically written in Hypertext Markup Language ("HTML"). By using this common language, a server system and a Web browser can communicate with easy-to-use graphical Web pages. When a client system receives an HTML formatted document from a Web server, the Web browser software displays the Web page according to the HTML tags. It is the HTML tags that direct a Web browser to display text, graphics, and other features in the manner designated by the Web page author. Further, a Web page can also define communications that result from user actions such as database queries. For example, the Web browser displaying a specific Web page will send a signal to the server system if the user clicks a mouse button while the mouse pointer is situated over a certain area of the Web page. Web pages may also contain hyperlinks ("links") that cause the Web browser to request a specific URL when that link is invoked ("clicked") by the user.

The "Web site-centric" paradigm is widely recognized to be inefficient and awkward to use. Several projects are underway with the intent to "personalize" the Internet, i.e. to make the Internet less Web site-centric. Personalized portals, such as "My Yahoo!" by Yahoo! Inc. of Santa Clara, Calif., and "My Excite" of Excite@Home of Redwood City, Calif., allow an individual user to set up a personalized Web page that contains links to information from preselected sources. Personal information aggregation that is facilitated by companies such as Yodlee.com Inc. of Redwood City, Calif. allow an individual user to set up a personalized Web page that contains data, including personal data, that is culled from pre-elected Web sites defined by the user.

Personalization has also spread beyond the Web site, as companies such as MicroStrategy Incorporated of Vienna, Va., send information from pre-selected sources to an individual user's mobile phone, personal digital assistant ("PDA"), or e-mail server.

Security and anonymity on the Internet for individual users are available through use of the "Freedom" software sold by Zero-Knowledge Systems Inc. of Montreal, Canada. By masking the origin and the identity of the user's online activities, the user remains anonymous on the (unsecure) Internet and thus retains control over the disclosure of his personal information. Zero-Knowledge is not, however, a "trusted third party." On the contrary, Zero-Knowledge wishes to remain merely a masking agent to whom the user's identity is also unknown and not retrievable.

Finally, Microsoft Corporation's ".NET" initiative seeks to make the Web and its services ubiquitous. According to Microsoft, "Microsoft .NET extends the ideas of both the Internet and the operating system by making the Internet itself the basis of a new operating system. Ultimately, this will allow developers to create programs that transcend device boundaries and fully harness the connectivity of the Internet in their applications." Microsoft .NET Developer Overview, available at: http://www.microsoft.com/net/developer/developers.asp The Web services model on which it is based means that while the central business elements of corporate applications will still generally be managed locally, the services to support them—user authentication, file storage, user preference management, calendaring, mail, and the like—can be subscribed to seamlessly instead of locally managed." Microsoft .NET IT Overview, available at http://www.microsoft.com/net/it/netforit.asp The .NET initiative seeks to provide Microsoft software that will enable the exchange of documents, via the Extensible Markup Language ("XML"). Use of XML will enable disparate Web sites to exchange data with one another, thereby automating the control of the Internet for greater ease of use. However, without an effective, targeted way to personalize, organize, and manage tremendous amounts of online information, the Microsoft .NET initiative remains wholly Web site-centric and extremely difficult to execute.

Unfortunately, none of the prior art Web-reform projects, alone or in combination, achieve the ideal of the individual-centric Internet experience. There is, therefore, a need in the art for an apparatus and method for enabling a truly individual-centric Internet presence and experience.

SUMMARY OF THE INVENTION

The present invention is a method and apparatus for presenting persistent presence of individual users and providing services to them on a network such as the Internet. The present invention is useful, for example, when an individual user wants to execute a financial transaction with an Internet business while maintaining his privacy. The persistent presence can be augmented with verification attributes that are provided by another party, such as a financial institution.

The present invention is composed of two basic components: the personal base instance; and the personal base server. The personal base instance can itself be augmented with a database and/or persistent mass storage in order to store and retrieve information for the personal base. All of these components are typically implemented in software, although part or all of these functions can be implemented in hardware. Moreover, the personal base instance and the personal base server can be instantiated on disparate computer systems in hardware and/or software so long as they are in operative communication with each other. However, the personal base instance and the personal base server are, in alternate embodiments of the present invention, encapsulated into a personal base service provider that presents a single presence to the user and to the Internet.

The personal base instance is used to communicate with the user. The user communication can be established with any digital or analog device using any number of predefined protocols. The personal base instance is also tasked with maintaining certain information about the user. This information can, at the user's behest, be transmitted to the personal base server and thus to entities outside of the personal base service provider. The personal base server is the element that insulates the personal base instance from the rest of the nodes on the computer network. Other users, software processes, or other Internet personal service providers communicate with the user's personal base through the personal base server. Multiple personal bases can utilize the same personal base server. Signals from third parties that are destined for the user are first received by the personal base server, and are then forwarded to the personal base instance. In some cases, specialized information, such as medical or scheduling, is transmitted to specific layers of the personal base instance. It is contemplated that the personal base server, as well as the personal base instance, are equipped with suitable encryption capabilities in order to facilitate sensitive transactions.

The present invention anticipates the extension of the concept of a personal base. For example, higher levels of personal base's can be created to build a "company base" or other organizational base. Similarly, the concept can be extended to a lower level to encompass objects such as a house, a car, or an appliance. The latter being called an "object base."

Other technical advantages of the present invention will be readily apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 6 is an illustration of a Web-based user-interface and embodiment of the present invention;

DETAILED DESCRIPTION OF THE INVENTION

Figure 1:
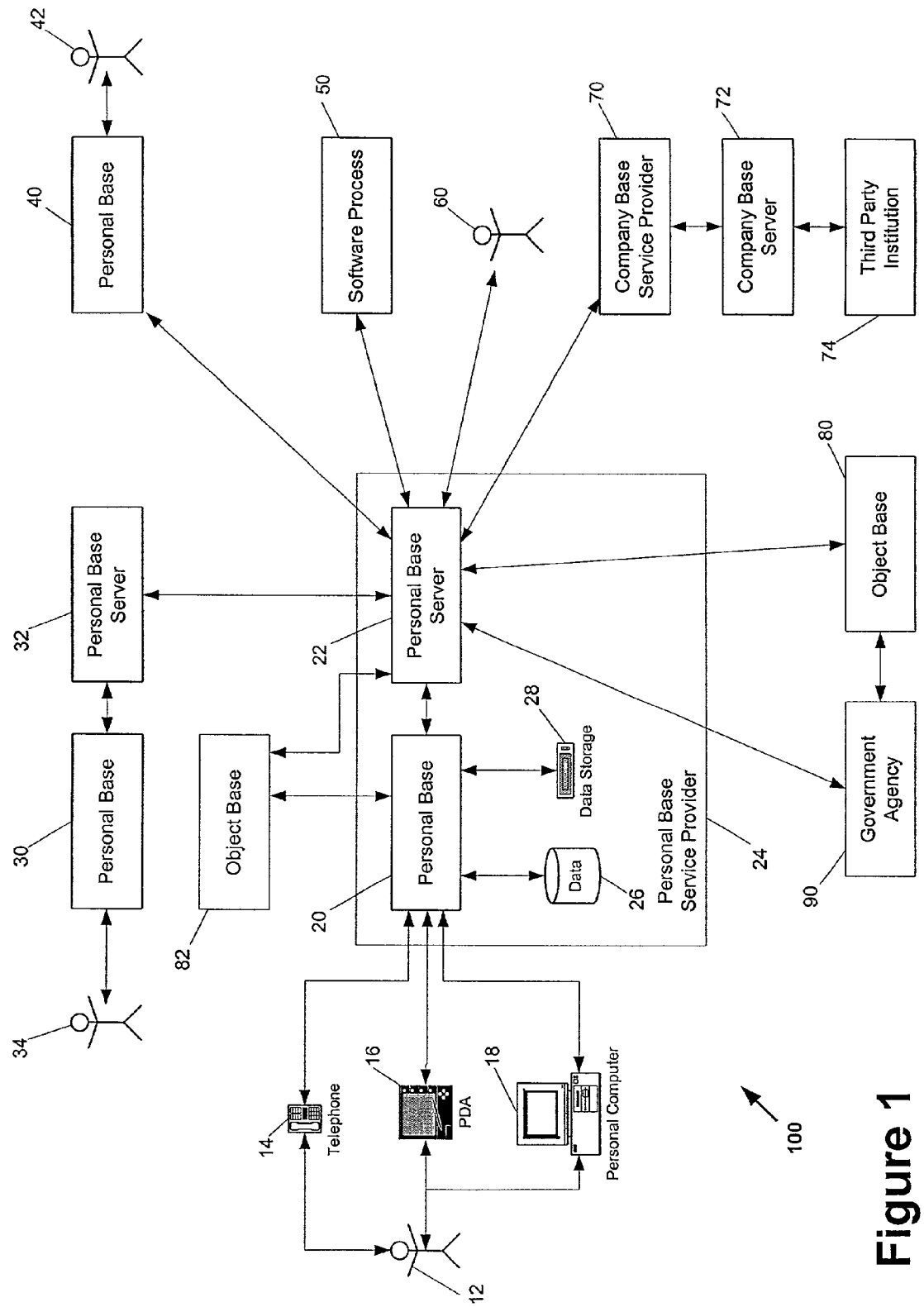
FIG. 1 is a schematic block diagram of an embodiment of the present invention.

The present invention overcomes the problems inherent in the prior art by providing to the Internet an infrastructural enhancement that facilitates an individual-centric personal base paradigm. Specifically, the present invention provides a structure having multiple layers, multiple nodes, and interactive software to act as a network agent that represents and serves individuals and organizations on wireless networks, local area networks and wide area networks such as the Internet. The present invention optionally includes a database and associated database engine along with multiple interfaces that can perform a wide variety of tasks.

The preferred embodiment of the present invention includes a personal base, which is a software process that has a persistent presence on a wide area network, such as the Internet. The personal base can be a process running in conjunction with a personal base server (that can handle the interactions between multiple personal bases). The personal base itself normally interacts with a single personal base server but can also interact with the user's input devices such as a personal computer, personal digital assistant, telephone, or other suitable device. The personal base may optionally be equipped with a database and database engine and/or other storage media for storing information that the user designates be saved and be accessible from the personal base. These features enable the personal base to act as a persistent network agent to perform various tasks for or on behalf of the user.

An alternate embodiment of the present invention merges the interface capability of the personal base server into the personal base to form an independent or enhanced personal base. The independent personal base is thus equipped to perform all interface functions without the need for a separate personal base server. This embodiment is useful when the personal base is embedded into a purpose-built device, such as a cellular telephone, that can maintain a constant connection to a network, such as a telecommunications network, from which information may be transmitted to the user or tasks may be performed on behalf of the user.

Alternate embodiments of the present invention include higher levels of personal bases that are used to create an "organization base" or "company base." Company bases can be used to provide a permanent Internet presence for a business organization or other non-profit organization. The company base can be used to interact with other company bases or personal bases in the same manner as a personal base. For example, a company base can be used to interact with vendor's personal bases for the requisition of supplies. The company base can also interact with the personal bases of employees (for payroll issues) and regulatory agencies (such as the IRS) for tax or workplace compliance issues. The company base can also be a network interface for customers (either retail (personal base) or wholesale (company base)). The company base itself may be made up of an amalgamation of personal bases or other objects having company-specific interfaces to enable the company to have a desirable (emergent) behavior in order to automate many routine functions of the company. Moreover, the company base may also have links to object bases (see below) that further enhance the accounting and management functions of the company. Finally, the company base has the same capability as the personal base to conduct queries, postings, transactions or other functions defined below.

Another alternate embodiment of the present invention includes an object base that extends the personal base to other (non-human) objects such as houses, cars, appliances, livestock, crops, or other forms of real or personal property. The object base can be used to retain, for instance, ownership information, age, condition, etc. Moreover, the object base can be used to interact with government agencies for registration requirements or legal compliance issues. For instance, an object base can be created for an automobile. This object base can retain the registration number of the vehicle. Upon payment of annual fees, the state agency (such as a department of motor vehicles) can interface with the particular object base instance in order to update the registration information. Similarly, a service station can interface with the particular object base instance to update maintenance information and state-required vehicle inspections. Other maintenance related information (such as need for oil changes and periodic maintenance) can be stored in the particular object base instance which can be self-triggered to send a message to the owner (via e-mail or other communications mechanism) as a reminder, or to a governmental agency as a notification that some state-required activity has been accomplished. Alternatively, object bases 82 can have a permanent link to the user's personal base server 22 (or personal base 20), thereby enabling automatic scheduling of events, etc., without need for intercommunications mechanisms such as e-mail.

An embodiment of the present invention is illustrated in FIG. 1. The computer system 100 of the present invention has a user 12 that communicates with a personal base 20 via one or more intermediary devices such as telephone 14, personal digital assistant ("PDA") 16, and personal computer 18. Although these three devices are suitable intermediary devices, they are not the only ones that can be used. Any device that can interact with the personal base (using any mutually available protocol), and that has some form of user-interface, would be a suitable intermediary device.

In this embodiment of the present invention, personal base 20 resides within a personal base service provider 24 that includes a personal base server 22, a database 26, and a data storage element 28. The database 26 and the data storage element 28 are used to store data that is specific to the user 12 for use in various transactions involving the user's personal base 20 and the personal base server 22. The personal base server 22 is preferably a separate process from the personal base 20. Having separate processes enables one device of the overall computer system to handle interactions with a variety of mechanisms (and have the necessary hardware) for the personal base server 22 while the personal base process 20 can be embedded in a simpler device that does not requires all of the disparate communications hardware that is required of the personal base server 22. However, as technology advances and enables more functionality in smaller packages, it may become desirable for the personal base 20 to handle all of the communications and persistence functions that are envisioned for the personal base server 22. In that case, the personal base server 22 can be merged into the personal base 20.

The personal base service provider 24 is the institutional aspect of the present invention. The personal base service provider 24 is the entity that provides the necessary hardware (servers, disk space, network connectivity, etc.) that is necessary for the implementation of the present invention. The personal base service provider may also arrange for the personal base to have a particular domain name and static Internet Protocol (IP) address, although the IP address can be arranged easily by other parties, including the user. Although the personal base service provider is the institutional entity, it is the personal base server 22 that provides the persistent interface to the Internet on behalf of the user 12. The personal base server 22 is the software entity that interfaces with other personal base servers 32, software processes 50, users 42, 60 and their personal bases 40 (if any). Moreover, the personal base server 22 is the software entity that coordinates the transactions with third-party institutions 74, either directly or through their own company base servers 72 and company (organization) base service providers 70. Similarly, the personal base server 22 can communicate with an object base 80 or a governmental agency 90 as illustrated in FIG. 1. Moreover, the governmental agency 90 can communicate with object bases to query registration information or compliance with legal requirements and notify the user's personal base 20 via the personal base server 22 if something is awry. In this sense, the personal base server 22, and hence the personal base 20, become a persistent virtual entity that can represent the user 12 on the computer network 100 for a wide variety of tasks.

In this embodiment of the present invention, the personal base 20 and the personal base server 22 are implemented in software. However, it is well within the scope of the present invention for part or all of the personal base 20 or the personal base server 22 to be implemented in hardware. It should also be noted that there is no requirement that the personal base 20 coexist with the personal base server 22 on the same machine. So long as the personal base 20 can communicate with the personal base server 22 via a predetermined, mutually acceptable protocol, then the personal base 20 can be instantiated on any suitable machine separate and apart from the machine where the personal base server 22 is instantiated, thereby enabling the personal base to exist on a portable device. However, if the two instantiations are on separate devices, then it is advisable to have encrypted communication between the personal base 20 and the personal base server 22.

In operation, the user's personal base 20 is connected to, and fed data from, the personal base server 22 that is located in the personal base service provider 24. The personal base server 22 attaches hierarchical information tags ("tags") to data that is contained within the user's personal base 20 in order to allow that data to be identified and sorted. One set of tags labels data as either a request posting (i.e., data that was submitted to request information, products, or services) or a supply posting (i.e., data that was submitted to announce the availability of information, products, or services). Other tags can denote other categories and sub-categories to which specific data belong. Additional tags may denote ranges for time, geographic location, price, security, privacy, priority, and other related information.

The present invention facilitates automated responses to requests that are posted by the user 12. The automated response is handled by the personal base server 22 by means of a tag-matching process. The tag-matching process retrieves either an exact match, or the closest matches of the relevant tags contained with the user 12's request posting or the subsequent supply postings from other entities on the computer system 100. This allows the user 12 to issue a request posting to his personal base 20 that seeks relevant information from another user 60, another personal base 40, another software process 50, or a third-party institution 74, or any other entity that is connected to the computer system 100 that can communicate in one of the many protocols supported by the personal base server, including, but not limited to, TCP/IP and UDP. Conversely, the user 12 may also issue a supply posting to his personal base 20 that is intended to be matched to other people's request postings. For example, if the user 12 wants to buy a digital camera, he can issue a request posting to his personal base 20 specifying brand, price, and other requirements of the camera. This request will be picked up by other entities on computer network 100 and appropriate (supply) responses will be posted to the user's personal base server 22, which will then be transmitted to the user's personal base 20 for dissemination to the user by one or more of the intermediary devices mentioned previously. The user 12 can then sort through the various requests, using the embedded tags as sorting values. Similarly, the user 12 can redefine the request, perhaps by limiting the tags' ranges, to fine-tune search results. Future offers to sell may also be forwarded automatically to the personal base 20 if the user 12 identifies his request posting as a standing request. More and more business transactions may be conducted using this kind of "reverse advertising," wherein the individual user "advertises" his desire for a product and service and suppliers respond to his advertisement directly, rather than through some sales middleman.

The information-matching process performed by the personal base server 22 may include the use of "intelligent" software agents. These agents make use of extensive databases of current postings, matching patterns, correlation between patterns, statistical data such as frequently used phrases in request/supply postings, and an extended thesaurus of tags.

Figure 2:
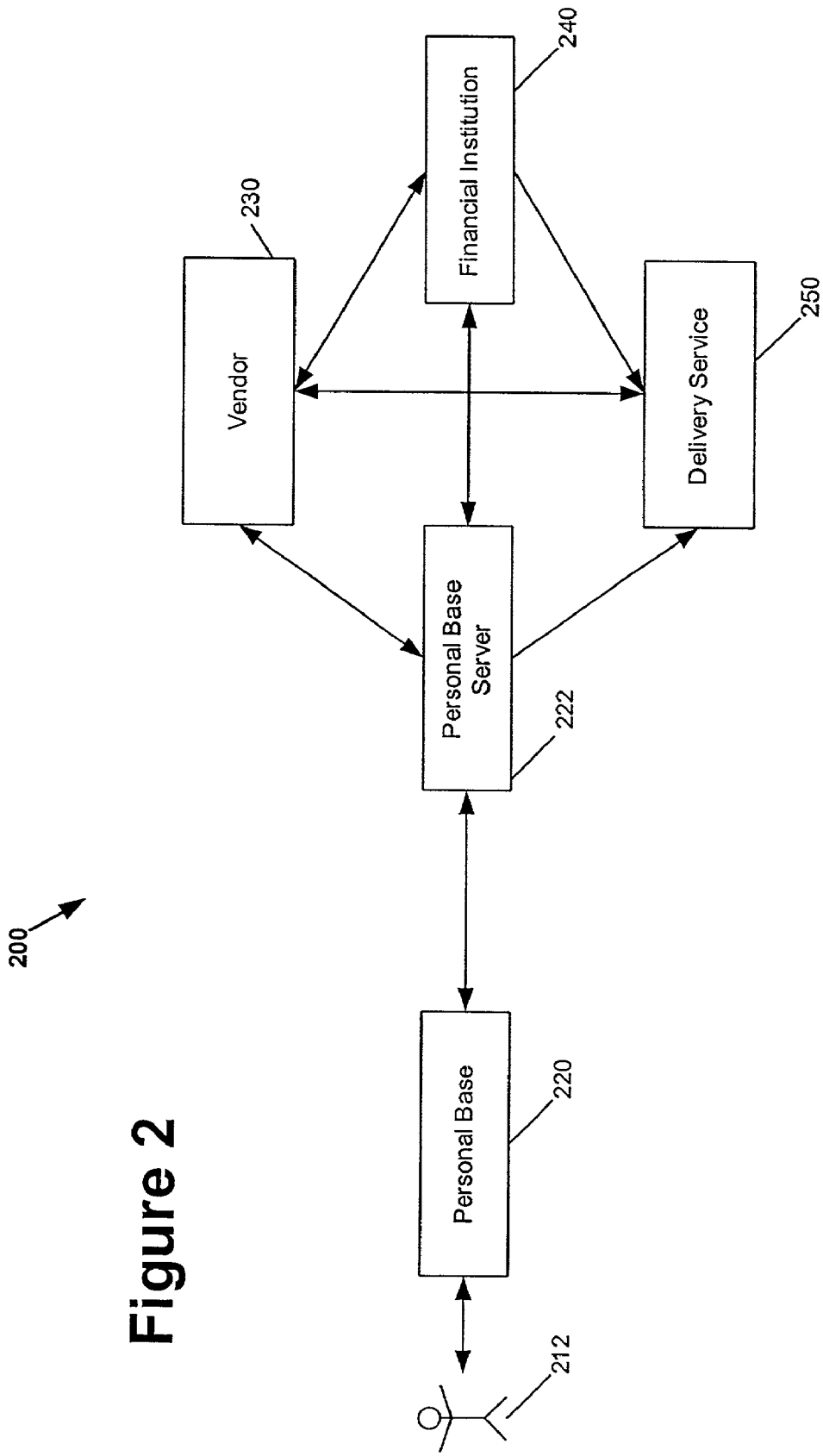
FIG. 2 is a schematic block diagram of an embodiment of the present invention that includes a third-party verification of a transaction.

FIG. 2 illustrates an alternate embodiment of the present invention, wherein a product is automatically purchased by and delivered to user 212. In this embodiment, the computer network 200 has a user 212, his personal base 220 and associated personal base server 222. Also connected to the computer network 200 are a vendor 230, a financial institution 240, and a delivery service 250, either or all of which may be represented by their own respective personal, company, or object base servers. The automatic purchase begins when user 212 posts a request on his personal base 220. By posting the request, user 212 delegates to his personal base server 222 the authority to execute a transaction if a suitable supply response is received. Next, vendor 230 forwards its supply response to personal base server 222. Alternatively, personal base server 222 might seek out a supply posting by forwarding the request posting of user 212 to various vendors (including vendor 230) and personal base servers (not shown). In either case, upon confirming that the supply response of vendor 230 fits the pre-defined criteria of the request posting, personal base server 222 automatically contacts the vendor 230.

Next, the transaction must be approved by financial institution 240. For that purpose, both the vendor 230 and the personal base server 222 send the details of their agreed-upon transaction to financial institution 240, for approval and execution of the transaction. In this embodiment, financial institution 240 is affiliated with user 212 as his bank or credit card provider. Alternatively, financial institution 240 could be affiliated with vendor 230, or with personal base server 222, or could be unaffiliated with the interested parties. Alternatively, personal base server 222 could contact the appropriate financial institution(s) to verify financial standing of both user 212 and vendor 230, masking the identity of each party from each other party's knowledge. In this case, a user will not need to reveal credit card numbers to vendors while making an online purchase.

Upon approval of the financial transaction, the financial institution notifies vendor 230, personal base server 222, and delivery service 250. Vendor 230 and personal base server 222 then send, respectively, pickup and delivery addresses to delivery service 250. User 212 need not reveal his home address or his identity to vendor 230. Personal base server 222 instead issues to vendor 230 and to delivery service 250 a transaction ID to match the product to its destination address. Finally, to assist in eliminating potential confusions, all of the aforementioned interrelated information is stored on the personal base server 222.

Figure 3:
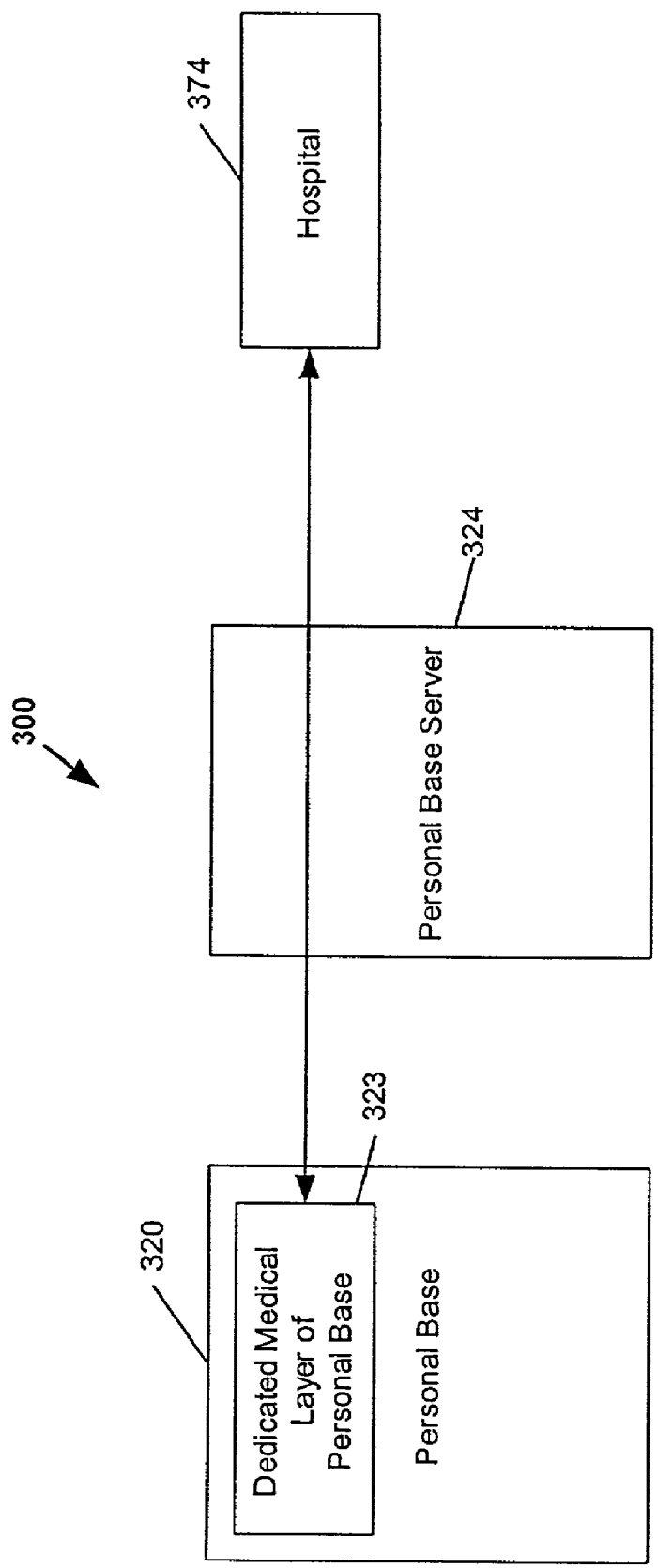
FIG. 3 is a schematic block diagram of an embodiment of the present invention that illustrates the construction of a Personal Base layer inaccessible to the Personal Base owner.

Shown in FIG. 3 is an embodiment of the present invention that illustrates the construction within a computer network 300 of a dedicated medical layer 323 of personal base 320, which is inaccessible to the user (not shown). Dedicated medical layer 323 was created with the consent of the user to provide a private location for medical data. Without such privacy measures guaranteed to them, medical personnel of hospital 374 might have refused to supply data to the personal base server 324. Also, for the benefit of having his medical data stored by his trusted personal base service center (not shown), the user readily agreed to forgo access to his own medical data, or may otherwise have read-only access rights to that medical data. A further benefit of installing the dedicated medical layer 323 is that medical institutions other than hospital 374 can make requests to the personal base service center for access rights when needed, for instance in the case of medical emergency. Alternatively, the dedicated layer of the personal base 323 may be stored in a personal base server (not shown), or with a government agency (not shown) or with a medical institution's company base server (not shown).

Figure 4:
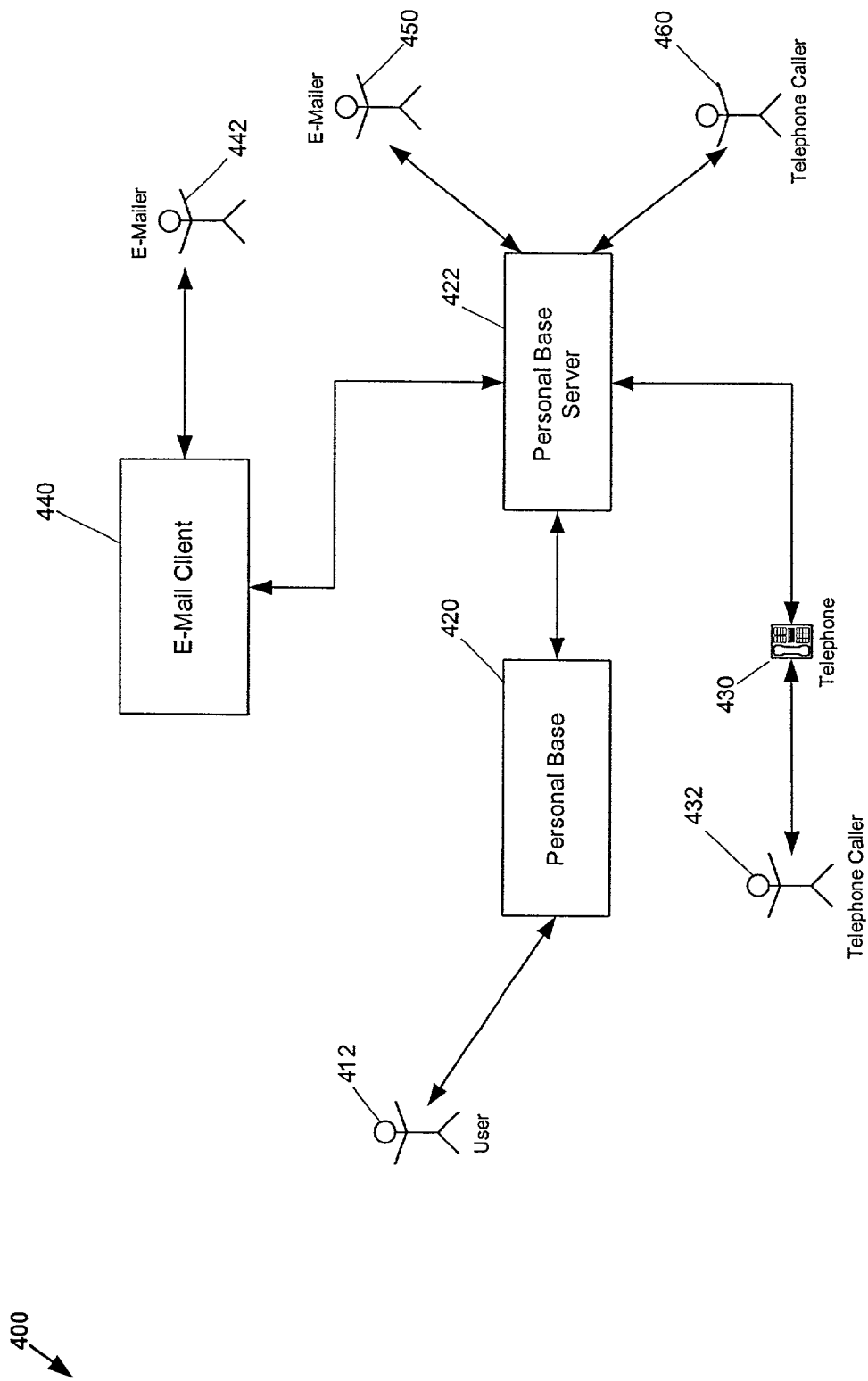
FIG. 4 is a schematic block diagram of an embodiment of the present invention that includes elements of the traditional Internet.

Shown in FIG. 4 is an embodiment of the present invention that includes elements of the traditional Internet. Telephone caller 432 uses telephone 430 to connect via the traditional telephone network or via the traditional Internet to personal base server 422 that is connected to the personal base 420, which interfaces with user 412, all within the computer network 400. The connection is established via the dialing of the direct telephone number of user 412.

Telephone caller 460 is connected through the personal base Internet to personal base server 422, which in turn is connected to personal base 420. Caller 460 may have used the Universal ID number (not shown) of user 412 or a pre-selected link on the personal base of caller 460 to initiate these connections. However, whether user 412 answers the call or not depends on his current priority list (at work or at home) and the position of caller 460 on the caller priority list of user 412 (according to the status of caller 460 as a family member or as a stranger, for example). Both caller 432, using the traditional telephone network, and caller 460, using the personal base Internet, are easily able to telephone user 412, thanks to the unobtrusive integration of the personal base Internet with the traditional Internet and traditional telephone network.

E-mailer 442 uses his e-mail client 440 to connect via the traditional Internet to personal base server 422, that is in operative communication with personal base 420. The connection is established by addressing the e-mail to the direct e-mail address of user 412. E-mailer 450 is connected through the personal base Internet to personal base server 422, which in turn is connected to personal base 420, which in turn interfaces with its owner, user 412. E-mailer 450 may use the Universal ID number of user 412 (not shown) or a pre-selected link on his personal base 420 to initiate these connections. Both E-mailer 442 and E-mailer 450 are easily able to send e-mail to user 412, due to the unobtrusive integration of the personal base Internet with the traditional Internet.

The Universal ID number is a new number, which represents a single individual, for instance, user 412. It can replace all of the existing addresses and IDs of user 412: his home address, work address, e-mail addresses, and telephone numbers, etc. This ID number should eventually be internationally universal, and will also coexist with current addresses and IDs.

For representation purposes, then, user 412 needs only his name, one ID, one ID interface device, his personal base 420, and one set of passwords for all online and offline activities. For offline activities, an ID interface device automatically connects the real world to the personal base-enhanced Internet necessary for achieving this connection. An example of an ID interface device would be a card that looks like a credit card. The magnetic stripe on this card would contain only the Universal ID number of user 412. Since the card would not contain any personal data, it would offer better security than a personal data-rich "smart" card.

A Universal ID interface card may play the role of all of the current cards of user 412, including his debit cards, credit card, and driver's license. Card security is achieved through the use of a Personal Identification Number ("PIN") that must be remembered by the owner, user 412. In case of the loss of a card, user 412 can easily report to the personal base service center and get a replacement with a new PIN. Like a smart card, the Universal ID interface card is a replacement for all other cards. The interface card is also an improvement over the smart card; the interface card does not carry personal information and will not be made obsolete by changes in technology.

To illustrate the Universal ID system, further examples of applications assisted by the personal base-enhanced Internet are as follows: First, the Universal ID can replace a physical postal delivery address. For sending letters or packages to user 412, a sender uses the universal ID for envelopes and labels. The Post Office (not shown) then contacts the personal base server 422 to match IDs and their corresponding addresses. The Post Office next marks the mail with its own delivery code. With this approach, when a personal base owner moves, no change of address notice is needed for either the Post Office or for his family and friends. The only thing personal base owner, user 412, does is to change his address on the personal base. Similarly, this approach can be easily applied to other address changes, such as e-mail or telephone number changes.

As a second example of an application of the Universal ID, to buy a product at a store, user 412 slides his ID card through a receiving device at the checkout counter and enters his PIN (not shown). First, the transaction details are sent to personal base server 422. The personal base server 422 then contacts the credit card company of user 412 for approval of this transaction (not shown). The store will send the bill to the credit card company and send a transaction record to personal base 420. At the same time, the Universal ID and the transaction are saved into the store's database. That database will be used for a receipt, for recalls, and for advertising reference. Online shopping may be conducted in a similar fashion.

As a third example of an application of the Universal ID, to participate in an event, after pre-registering, user 412 may be registered automatically by giving the event clerk his Universal ID card. If the event is a conference, information will be retrieved from personal base 420 and recorded in the registration database of the conference (not shown). In the future, notices for similar conferences will be sent to personal base 420. If applicable, a bill will be sent to personal base 420 as well. This process for participating in events applies also to a visit to a doctor's office, or a concert, or enrollment in a school.

In sum, using the Universal ID system enables user 412 to interact effortlessly with the world, while retaining perfect control over his personal data. Vendors and service-providers may only access information authorized by personal base service centers. User 412 should be able to protect the security of his ID, such as a universal ID card, with a personal identification number (PIN). Another happy consequence for user 412 is that the number of unsolicited phone calls or "spam" E-mails he receives will be reduced.

Figure 5:
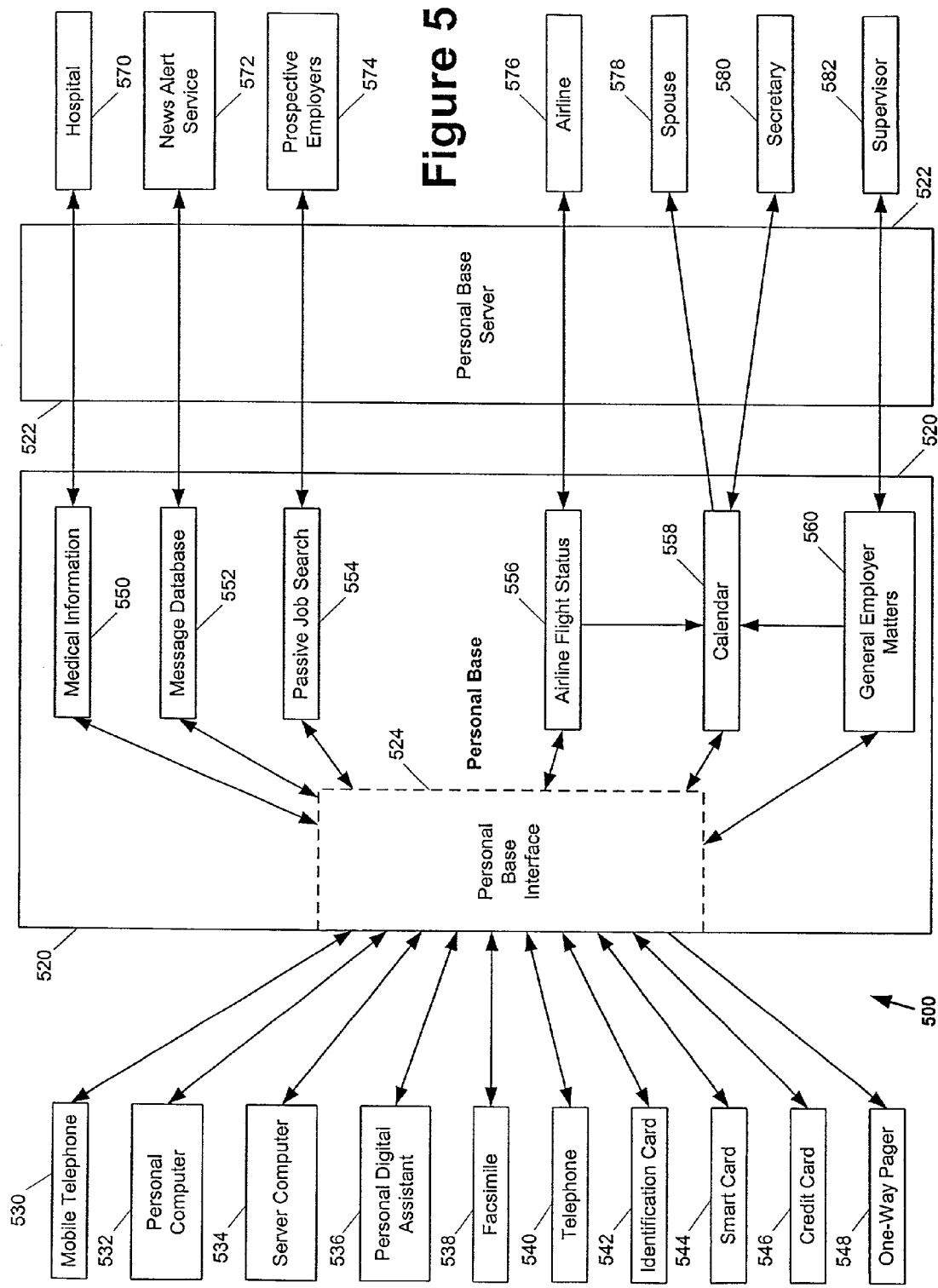
FIG. 5 is a schematic block diagram of an embodiment of the present invention that includes devices that are used to access a Personal Base.

Shown in FIG. 5 is an embodiment of the present invention that includes devices that are used to access a personal base 520. Personal base 520 comprises an user interface 324 and personal base layers 550, 552, 554, 556, 558, and 560. User interface 524 directs data and intermediates between the database layers of personal base 520 and devices 530, 532, 534, 536, 538, 540, 542, 544, 546, and 548. Of these devices, mobile phone 530, personal computer ("PC") 532, server computer 534, personal digital assistant ("PDA") 536, facsimile 538, telephone 540, identification card 542, smart card 544, and credit card 546 are employed in two-way connections to personal base 520, via user interface 524. One-way pager 548 in a one-way connection to initiate receipt of information from personal base 520 via interface 524.

Layers 550, 552, 554, 556, 558, and 560 are parts of the personal base 520. The layers are connected to interface 524, which is in turn in connected to devices 530, 532, 534, 536, 538, 540, 542, 544, 546, and 548. Medical information 550 employs a two-way connection to hospital 570 via personal base server 522. The highly sensitive data stored in layer 550 is unavailable even to interface 524, per the embodiment shown in FIG. 3. Since the personal base user may monitor neither the content nor the access log of layer 550, failsafe authentication of hospital 570 is needed.

Authentication is important to both users and service providers. All personal bases have the option of being registered by a personal base service center. Non-registered ersonal bases are not permitted to participate in any transactions requiring registration.

Qualified service providers must obtain registration IDs and authentication of good standing in their lines of business from personal base service centers, in order to be authorized to send information to appropriate layers within the user's personal base 520. Hospitals, as in the present embodiment, are authorized to add information only to the medical information layer 550 within personal base 520. Car repair shops (not shown) are authorized to send car repair records to personal base 520, and perhaps to access existing repair records (not shown).

In a transaction process, the validity of a registration or an authorization will be authenticated. Financial means verification is a crucial part of this authentication; the parties to the transaction demand accurate representation of the other parties' resources.

Message database 552 employs a connection to news alert service 572 via personal base server 522, whereby news updates are sent to the message database 552. Layer 552 in turn employs a connection to interface 524, whereby the news updates are routed to a user device, and whereby the user may store messages and files in layer 552.

Passive job search 554 employs connections to prospective employers 574 via personal base server 522, whereby employment opportunities are sent to layer 554. Layer 554 in turn employs a one-way connection to interface 524, whereby employment opportunities are routed to a user device. A passive job search is an activity perhaps not suitable for the use of one's main Universal ID (not shown). In this case, another Universal ID can be ordered, for use in clandestine activities.

Airplane flight status 556 employs a two-way connection to airline 576 via personal base server 522, whereby flight information is sent to layer 556. Layer 556 in turn employs a connection to interface 524, whereby the flight information is routed to a user device. Layer 556 also employs a one-way connection to calendar 558, whereby the flight information is entered or revised in the calendar 558.

General employer matters 560 employs a connection to supervisor 582 via personal base server 522, whereby the employer's memoranda are sent to layer 560. Layer 560 in turn employs a connection to interface 524, whereby the memoranda is routed to a user device. Layer 560 also employs a one-way connection to calendar 558, whereby employer-ordered meetings and deadlines are entered or revised in calendar 558.

Calendar 558 is connected to layers 556 and 560, whereby appointments and events are entered or updated in calendar 558. Calendar 558 also employs a one-way connection to spouse 578 via personal base server 522, whereby spouse 578 may have read-only access to calendar 558. Calendar 558 further employs a connection to secretary 580 via personal base server 522, whereby secretary 580 may both read and revise calendar 558. Last, calendar 558 further employs a connection to interface 524, whereby the user may both read and revise his own calendar 558.

Shown in FIG. 6 is an example of a user's Web page-format view 600 of his personal base. From this front page, the user may access second-level pages. The user may then access the entire online universe from second-level pages such as "Transactions" and "Work," without viewing a single external Web page. In sum, to the user, the personal base is the whole world, "virtually"; all kind of activities can be done there, including communicating with other personal bases. To others, the personal base is "virtually" its owner. The personal base is a dynamic "face" presented to others, with different features presented to every external entity. With personal bases as their virtual existence, individual users finally become the center of Internet use.

Figure 7:
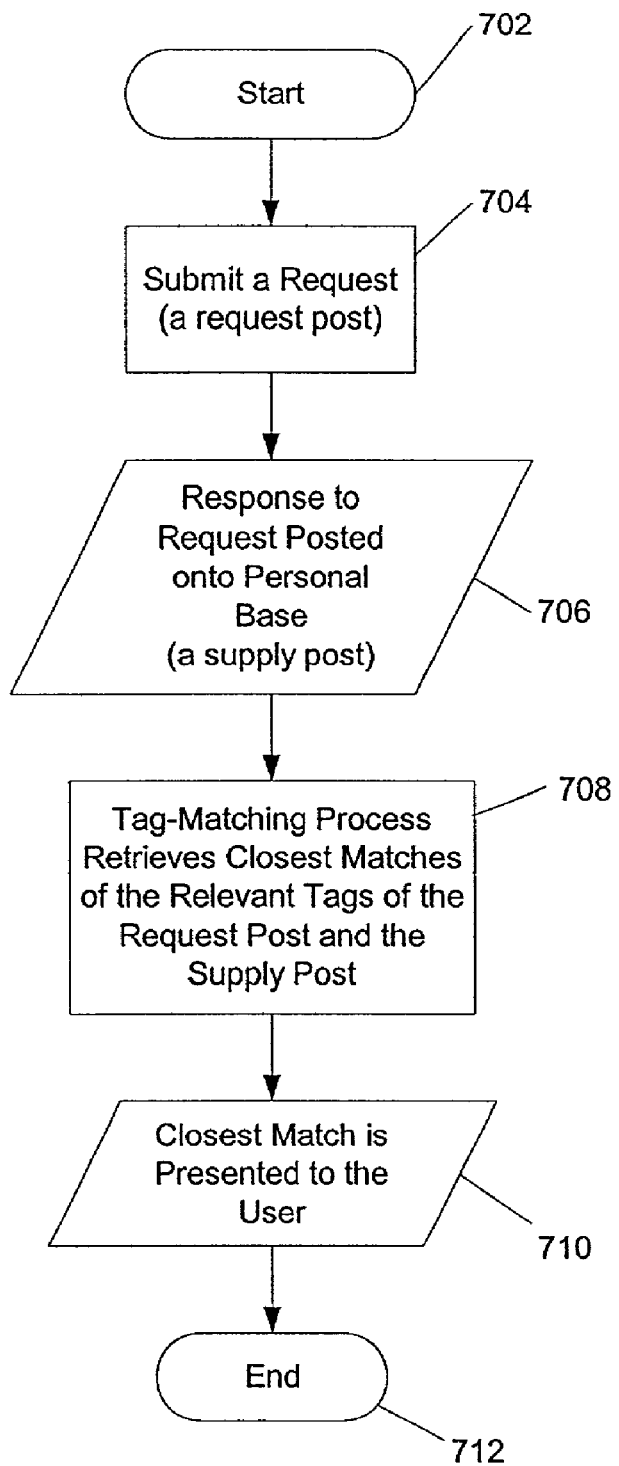
FIG. 7 is a flowchart illustrating a method of the present invention.

Shown in FIG. 7 is an embodiment of the information matching method of the present invention. The information matching method begins generally at step 702. Next, in step 704, the user submits a request, i.e., issues a request posting to his personal base. Then, in step 706, a supply posting is sent to the personal base by the supplier, via a personal base server. Next, in step 708, the personal base server performs a tag-matching process by comparing tags of the request posting to tags of all supply postings. Then, in step 710, the best match of postings achieved by the personal base server is presented to the user. Last, in step 712, the method ends.

Figure 8:
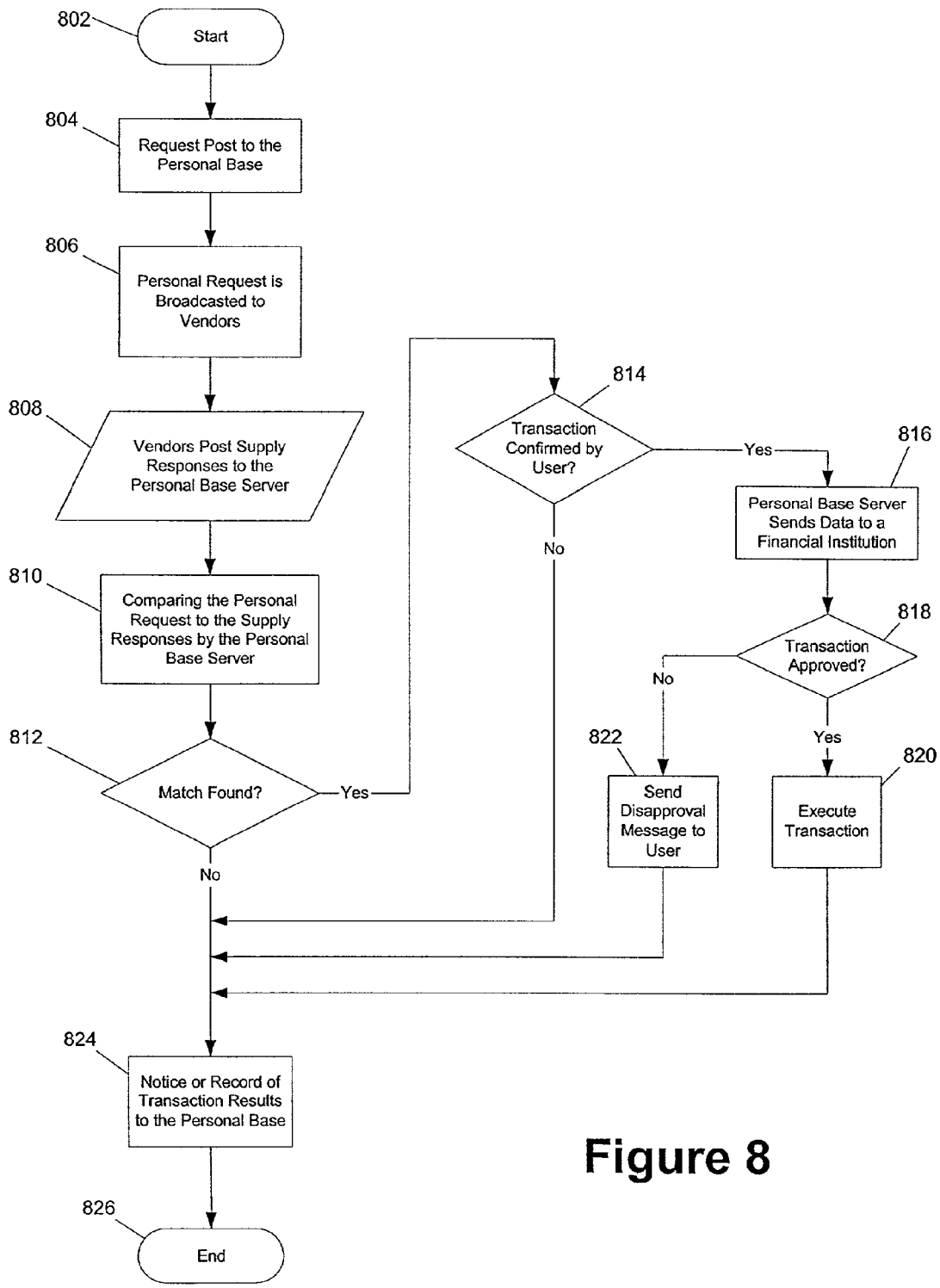
FIG. 8 is a flowchart illustrating an alternate embodiment of the method of the present invention.

Shown in FIG. 8 is an embodiment of the transaction method of the present invention. The transaction method begins generally at step 802. Next, in step 804, the user submits a request, i.e., issues a request posting to his personal base. Then, in step 806, the personal base server broadcasts the request posting to service-providers and vendors. Next, in step 808, service-providers and vendors issue supply postings to the personal base server. Then, in step 810, the personal base server performs a tag-matching process by comparing tags of the request posting to tags of all supply postings. Next, in step 812, a decision is made based on whether or not a match was found in the tag-matching process. If a match was not found, the method proceeds to step 824, where a notice is optionally issued to the personal base before the method ends at step 826. If a match was found, then the method proceeds to step 814. In step 814, a decision is made based on whether or not the transaction is confirmed by the user. If the transaction is not confirmed, then the method proceeds to step 824, where a notice is optionally issued to the personal base before the method ends at step 826.

If the transaction is confirmed, then the method proceeds to step 816. In step 816, the personal base server sends data related to the transaction to a financial institution. This data comprises the identities of the transacting parties and the nature of the transaction. In step 818, a decision is made based on whether or not the financial institution approves the transaction. If the transaction is not approved, then the method proceeds to step 822, wherein the personal base server sends a message to the user that the transaction has been rejected. Last, in step 824, the method ends. If, however, the transaction is approved, then the personal base server executes the transaction in step 820. Finally, the method proceeds to step 824, where a notice and a transaction record are made to the personal base and the method ends at step 826.

It should be noted that the apparatus and method of the present invention can be implemented in a variety ways. For instance, the bases can be implemented entirely in software, or entirely in hardware, or any combination there between. Software implementations (or portions thereof) can utilize a processor, either in an existing device, a server, or in an embedded devices, in conjunction with an appropriate amount of memory and input/output devices. Hardware implementations, such as application specific integrated circuits (ASIC's) are envisioned for hand-held or special-purpose devices that make the present invention more accessible for users.

The present invention, therefore, is well adapted to carry out the objects and attain both the ends and the advantages mentioned, as well as other benefits inherent therein. While the present invention has been depicted and described, and is defined by reference to particular embodiments of the invention, such references do not imply a limitation to the invention, and no such limitation is to be inferred. The invention is capable of considerable modification, alternation, alteration, and equivalents in form and/or functions, as will occur to those of ordinary skill in the pertinent arts. The depicted and described embodiments of the invention are exemplary only, and are not exhaustive of the scope of the present invention. Consequently, the present invention is intended to be limited only by the spirit and scope of the appended claims, giving full cognizance to equivalents in all respects.

What is claimed is:

1. A personal base process on a computer system, said computer system having multiple nodes that are interconnected to facilitate communication between said nodes, the computer system comprising at least one processor and a memory, said personal base process comprising:
   a personal base instance on at least one of said nodes on said computer system, said personal base instance being constructed and arranged to communicate with a
   a personal base server on at least one of said nodes on said computer system, said personal base server being constructed and arranged to communicate with said personal base instance and at least one of said nodes of said computer system other than said user devices;

wherein the personal base instance is configured to:
communicate with the personal base server;
bilaterally communicate with external third parties, which are external to the computer system, over a network only through the personal base server;
receive data from external third parties over the network only through the personal base server;
transmit data to external third parties over the network only through the personal base server; and
communicate with the user device, wherein the user device does not communicate directly with the personal base server.

2. A personal base process as in claim 1, wherein said personal base process further comprises a database in functional communication with said personal base instance, said database constructed and arranged to store data originating from said personal base instance.

3. A personal base process as in claim 1, wherein said personal base process further comprises data storage, said data storage in functional communication with said personal base instance, and said data storage constructed and arranged to store data originating from said personal base instance.

4. A personal base process as in claim 1, wherein said personal base process further comprises a database in functional communication with said personal base instance, said database constructed and arranged to provide data to said personal base instance.

5. A personal base process as in claim 1, wherein said personal base process further comprises data storage, said data storage in functional communication with said personal base instance, and said data storage constructed and arranged to provide data to said personal base instance.

6. A personal base process as in claim 1, wherein said personal base server has a dedicated medical layer.

7. A personal base process as in claim 6, wherein said node of said system in communication with said dedicated medical layer of said personal base server is a medical institution.

8. A personal base process as in claim 1, wherein said node of said system in communication with said personal base server is a second instance of a personal base.

9. A personal base process as in claim 1, wherein said node of said system in communication with said personal base server is a second user device.

10. A personal base process as in claim 1, wherein said node of said system in communication with said personal base server is a second personal base process.

11. A personal base process as in claim 1, wherein said node of said system in communication with said personal base server is a second personal server.

12. A personal base process as in claim 1, wherein said node of said system in communication with said personal base server is a second personal base.

13. A personal base process as in claim 1, wherein said node of said system in communication with said personal base server is another software process.

14. A personal base process as in claim 1, wherein said node of said system in communication with said personal base server is a third-party institution.

15. A personal base process as in claim 1, wherein said node of said system in communication with said personal base server is a telephone caller.

16. A personal base process as in claim 1, wherein said node of said system in communication with said personal base server is an e-mailer.

17. A personal base process as in claim 1, wherein communication between said personal base instance and said user device is via a telephone.

18. A personal base process as in claim 1, wherein communication between said personal base instance and said user device is via a personal computer.

19. A personal base process as in claim 1, wherein communication between said personal base instance and said user device is via facsimile.

20. A personal base process as in claim 1, wherein communication between said personal base instance and said user device is via a personal digital assistant.

21. A personal base process as in claim 1, wherein communication between said personal base instance and said user device is via a keyboard.

22. A personal base process as in claim 1, wherein communication between said personal base instance and said user device is via a touch-sensitive video screen.

23. A personal base process as in claim 1, wherein communication between said personal base instance and said user device is via e-mail.

24. A personal base process as in claim 1, wherein communication between said personal base instance and said user device is via a Web page.

25. A personal base process as in claim 1, wherein communication between said personal base instance and said user device is via a mobile telephone.

26. A personal base process as in claim 1, wherein communication between said personal base instance and said user device is via a server computer.

27. A personal base process as in claim 1, wherein communication between said personal base instance and said user device is via a smart card.

28. A personal base process as in claim 1, wherein said communication between said personal base instance and said user device is authenticated via an identification card.

29. A personal base process as in claim 1, wherein said communication between said personal base instance and said user device is authenticated via a smart card.

30. A personal base process as in claim 1, wherein said communication between said personal base instance and said user device is authenticated via a credit card.

31. A personal base process as in claim 1, wherein communication between said personal base instance and said user device is via a pager.

32. A personal base process as in claim 31, wherein said pager is a one-way pager.

33. A personal base process as in claim 1, wherein said personal base has at least one special layer devoted to a specific function.

34. A personal base process as in claim 33, wherein said special layer is devoted to medical information.

35. A personal base process as in claim 33, wherein said special layer is devoted to employer information.

36. A personal base process as in claim 33, wherein said special layer is devoted to scheduling information.

37. A personal base process as in claim 33, wherein said special layer is devoted to messages.

38. A computer program, stored in a non-transitory computer-readable medium, for providing a personal base process on a computer network, said computer network having multiple nodes that are interconnected to facilitate communication between said nodes, the program comprising executable instructions that cause a computer comprising at least one processor and a memory to:

provide a personal base instance on at least one of said nodes on said computer network, said personal base instance being constructed and arranged to communicate with a user device;

provide a personal base server on at least one of said nodes on said computer network, said personal base server being constructed and arranged to communicate with said personal base instance and at least one of said nodes of said computer network other than said user device;

wherein:
the personal base instance is configured to:
communicate with the personal base server, and
bilaterally communicate with external third parties, which are external to the computer only through the personal base server,
when the personal base instance transmits data to external third parties, the data is transmitted through the personal base server,
when the personal base instance receives data from external third parties, the data is received through the personal base server, and
the user device does not communicate with the personal base server.

39. An information handling system, comprising:
one or more processors;
a memory;
a shared storage system operably coupled to the one or more processors and the memory;
the processors operable to execute instructions for providing a personal base process on a computer network, said computer network having multiple nodes that are interconnected to facilitate communication between said nodes, wherein the instructions cause the at least one processor to:

provide a personal base instance on at least one of said nodes on said computer network, said personal base instance being constructed and arranged to communicate with a user device;

provide a personal base server on at least one of said nodes on said computer network, said personal base server being constructed and arranged to communicate with said personal base instance and at least one of said nodes of said computer network other than said user device;

wherein:
the personal base instance is configured to:
communicate with the personal base server, and
bilaterally communicate with external third parties, which are external to the information handling system, only through the personal base server,
when the personal base instance transmits data to external third parties, the data is transmitted through the personal base server,
when the personal base instance receives data from external third parties, the data is received through the personal base server, and
the user device does not communicate with the personal base server.

* * * * *